United States Patent Office 2,818,434
Patented Dec. 31, 1957

2,818,434
BIS(9- AND 10-HYDROXYOCTADECYL)AMINES

Robert J. Vander Wal, Chicago, James Harwood, Western Springs, and Richard A. Reck, Chicago, Ill., assignors to Armour and Company, Chicago, Ill., a corporation of Illinois No Drawing. Application June 24, 1955
Serial No. 517,902

2 Claims. (Cl. 260—584)

This invention relates to secondary and tertiary hydroxyoctadecylamines.

This application is a continuation-in-part of our copending patent application Serial No. 145,088, filed February 18, 1950, now U. S. Patent No. 2,712,558, entitled 9- and 10-hydroxyoctadecylamines and is directed to secondary and tertiary hydroxyoctadecylamines which can be represented by the formula

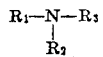

wherein $R_1$ represents a 9-hydroxyoctadecylamine radical or a 10-hydroxyoctadecylamine radical, $R_2$ represents a 9-hydroxyoctadecyl radical, a 10-hydroxyoctadecyl radical or a methyl radical, and $R_3$ represents hydrogen or a methyl radical.

These compounds are useful as starting materials in the preparation of quaternary ammonium compounds which can be used in germicidal compositions, ore flotation processes and secondary oil recovery flood waters. These compounds, containing active hydrogen in the hydroxyl group in the middle of the chain, and in the case of the secondary amines, in the amine group itself, can be reacted with polyisocyanates to produce resins and foams. They can also be reacted with various alkylene oxides such as ethylene oxide and propylene oxide to produce compounds having surface active properties.

It is, therefore, an object of this invention to provide a novel and useful group of secondary and teritary hydroxyoctadecylamines. Other objects and advantages will appear as the specification proceeds.

In the preparation of the secondary hydroxyoctadecylamines, we prefer to use as a starting material a hydroxy nitrile having 18 carbon atoms and having a hydroxyl radical attached to the 9th or 10th carbon atoms. In U. S. Patent 2,558,666 to Robert J. Vander Wal for Nitrile Derivatives, there are set out a number of hydroxy nitriles together with various methods for producing them. In general, nitriles prepared from oleic acid and containing an unsaturated double bond between the 9th and 10th carbon atoms are treated with sulfuric acid followed by hydrolysis. Through this method there is produced a statistical mixture of the 9- and 10-hydroxystearonitrile isomers which can not be separated by any known simple methods. It is this statistical mixture of 9-hydroxystearonitrile and 10-hydroxystearonitrile which is used as the starting material in the preparation of the secondary hydroxyoctadecylamines of the present invention.

Starting with the hydroxy nitriles as above described, we find that the amines can be produced by hydrogenation in the presence of a hydrogenation catalyst when the temperatures are maintained within the range of about 140° to 220° C., and with corresponding pressures ranging between about 150 lbs. to 2,000 lbs. per square inch. In general, a mixture of primary and secondary amines is produced. However, various techniques can be employed for promoting the production of secondary amines such as are disclosed in U. S. Patents 2,355,356 and 2,358,030, and copending patent application Serial No. 338,599, filed February 24, 1953, now U. S. Patent No. 2,781,399, and patent application Serial No. 439,908, filed June 11, 1954, these latter two applications by Sydney H. Shapiro. The secondary amines can be separated from the primary amines by a distillation step.

The tertiary hydroxyoctadecylamines of the present invention can be prepared starting with either the primary or secondary hydroxyoctadecylamines hereinbefore described and methylating with formic acid and formaldehyde to protect the hydroxyl radical in the chain.

The following specific examples may be set forth:

Example I 160 parts of a mixture of 9- and 10-hydroxystearonitriles, prepared from red oil nitriles according to the procedure outlined in patent application Serial No. 536,617, now abandoned, and distilled, together with 3.2 parts of Raney nickel catalyst and 3.2 parts of 5% sodium hydroxide solution, were subjected to a pressure of 1400 pounds per square inch and a temperature of 140° C. for about 4½ hours. The catalyst was removed by filtration and the product was distilled yielding 91.7 parts of a mixture of primary 9- and 10-hydroxyoctadecylamines having a boiling point of 173–180° C. at 0.35 mm. The residue consisted of 58.5 parts of a mixture of bis(9- and 10-hydroxyoctadecyl)amine which melted at 82–83° C. after crystallization from alcohol.

Example II 150 gms. of hydroxystearonitrile, 6 gms. of Raney nickel catalyst (50% Ni in water), 3 ml. of 5% sodium hydroxide were placed in a Parr pressure reaction apparatus. The apparatus was blown twice with 100 lbs. of hydrogen to sweep out the air contained therein.

The hydrogenation was carried out predominantly at pressures not exceeding 150 lbs. per square inch and at temperatures ranging from 145 to 150° C. with rapid agitation. During the first 48 minutes, a drop in hydrogen pressure of 70 p. s. i. was observed. A drop of 65 p. s. i. was observed during the next 80 minutes and of 80 p. s. i. during the subsequent 190 minutes. The hydrogen absorbed during the last 60 of the aforementioned 190 minutes was negligible, amounting to a drop of less than 5 p. s. i., showing that the reaction had definitely slowed down, if not dropped altogether at the low pressure employed. In order to finish the reduction the hydrogen pressure was increased to 300 p. s. i. and again to 500 p. s. i.

The total hydrogen absorbed at pressure less than 150 p. s. i. was represented by a drop in pressure of 232 p. s. i. Total hydrogen absorbed at higher pressures of 300 to 500 p. s. i. was represented by a drop in pressure of 75 p. s. i.

The reduction time at the lower pressures was 5 hours and 20 minutes, while at the higher pressures was 3 hours.

The reduced product was removed from the bomb, filtered to remove the suspended catalyst and distilled under reduced pressure. 136.3 gms. distilled. The distillate containing essentially primary hydroxyoctadecylamines amounted to 64.5% while the residue consisting of secondary hydroxyoctadecylamines amounted to 32.6%.

Example III

To a mixture of 21.7 gms. of 9- and 10-hydroxyoctadecylamines, 11 ml. of water and 3.2 ml. of alcohol, was slowly added 13 ml. of 85% formic acid. The mixture was stirred during the addition and the temperature was not allowed to rise above 80° C. After cooling, 20 ml. of 36% formaldehyde was added and the reaction was allowed to proceed at 60–80° C. The time required was about 2 hours. When the evolution of carbon dioxide stopped, the solution was made alkaline with sodium hydroxide and the amine separated and dried over sodium carbonate. The reaction product consisted essentially of dimethyl-9- and 10-hydroxyoctadecylamine.

While this invention has been described and exemplified in terms of its preferred ambodiments, those skilled in the art will appreciate that modifications can be made without departing from the spirit and scope of the invention.

We claim:
1. Bis(9-hydroxyoctadecyl) amine.
2. Bis(10-hydroxyoctadecyl) amine.

References Cited in the file of this patent
UNITED STATES PATENTS

| | | |
|---|---|---|
| 2,516,337 | Olin | July 25, 1950 |
| 2,712,558 | Vander Wal | July 5, 1955 |